SUPERCONDUCTIVE DEVICE

Filed June 8, 1962 2 Sheets-Sheet 1

Inventor :
Paul S. Swartz,
by Paul R. Webb, II
His Attorney.

SUPERCONDUCTIVE DEVICE

Filed June 8, 1962

Inventor:
Paul S. Swartz,
by Paul R. Webb, II
His Attorney.

3,158,794
SUPERCONDUCTIVE DEVICE
Paul S. Swartz, Schenectady, N.Y., assignor to General Electric Company, a corporation of New York
Filed June 8, 1962, Ser. No. 201,185
11 Claims. (Cl. 317—158)

This invention relates to high field superconductive devices and more particularly to high field superconductive devices for varying the compression of a magnetic field confined within a high field superconducting solenoid therein.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous in generators, direct current motors and low frequency transformers, and to advances in cryogenics which removed many of the economic and scientific problems involved in extremely low temperature operations.

As is well known, superconduction is a term describing the type of electrical current conduction existing in certain materials cooled below a critical temperature, $T_c$, where resistance to the flow of current is essentially non-existent. A high field superconductive body is a body with a superconducting phase which remains superconducting in a magnetic field greater than the critical magnetic field of that phase in homogeneous, unstrained bulk form.

A copending patent application entitled "Superconductive Devices," which was filed on November 2, 1961, as Serial Number 149,595, is assigned to the same assignee as the present application. In this copending application, a high field superconductive device is disclosed and claimed which comprises a high field superconductive body having an aperture therethrough, means to maintain the temperature of the body below its critical temperature, a magnetic field generally parallel to the axis of the aperture confined substantially within the aperture of the body, and means for varying the compression of the magnetic field. Another copending patent application entitled "Superconductive Device" which was filed in June 8, 1962, as Serial No. 201,184, is assigned to the same assignee as the present application. In this latter copending application, a high field superconductive device is disclosed and claimed which comprises a high field superconductive solenoid having an aperture therethrough, a coating of a non-superconducting material on the solenoid, means to produce a magnetic field generally parallel to the axis of the aperture within the aperture of the solenoid, means to maintain the temperature of the solenoid below its critical temperature, and means for compressing the magnetic field. The present application is directed to an improved high field superconductive device for varying the compression of a magnetic field confined within a high field superconductive solenoid therein.

It is an object of my invention to provide a high field superconductive device.

It is another object of my invention to provide a high field superconductive device for varying the compression of a magnetic field confined within a high field superconductive solenoid therein.

It is a further object of my invention to provide a high field superconductive device for varying the compression of a magnetic field confined within a solenoid therein, thereby increasing the magnetic field strength thereof.

In carrying out my invention in one form, a high field superconductive device comprises a high field superconductive solenoid having an aperture therethrough, a coating of non-superconducting material on the solenoid, means to produce a magnetic field generally parallel to the axis of the aperture substantially within the aperture of the solenoid, means to maintain the temperature of the solenoid below its critical temperature, and means for compressing variably the magnetic field.

These and various other objects, features, and advantages of the invention will be better understood from the following description taken in connection with the accompanying drawing in which.

Figure 1:
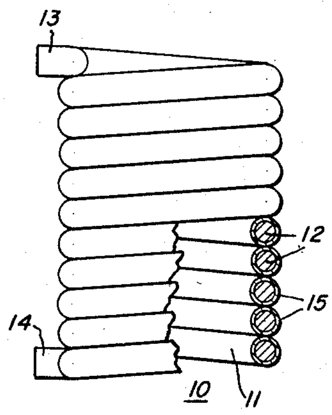
FIGURE 1 is a perspective view of a high field superconductive solenoid, partly in section.

In FIGURE 1 of the drawing, a high field superconductive solenoid 10 is shown having a central aperture 11 therethrough. Solenoid 10 comprises a plurality of closely wound coils 12 of a superconducting material, alloy or compound. The free or unjoined ends of the coils are designated 13 and 14. A coating 15 of non-superconducting, electrically conducting material is provided on coils 12 prior to winding into solenoid 10. For example, a wire containing $Cb_3Sn$ is coated with a non-superconducting electrically conducting coating of copper and coiled into a solenoid 10.

Figure 2:
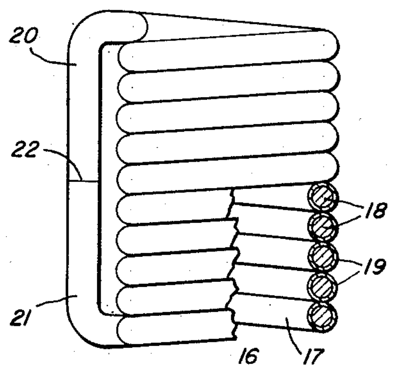
FIGURE 2 is a perspective view of a shorted high field superconductive solenoid, partly in section.

In FIGURE 2 of the drawing, a high field superconductive solenoid 16 is shown having a central aperture 17 therethrough. Solenoid 16 comprises a plurality of closely wound coils 18 of a superconducting material, alloy or compound. A coating 19 of non-superconducting, electrically conductive or electrically insulating material is provided on coils 18 prior to winding into solenoid 16. The coil ends 20 and 21 are shorted by joining them together at 22 by any suitable means. A coiled wire containing $Cb_3Sn$ with a coating of copper can also be employed for solenoid 16.

A high field superconductive device is constructed by employing a high field superconductive solenoid having an aperture therethrough, a coating of non-superconducting material on the solenoid, means to maintain the temperature of the solenoid below its critical temperature, a magnetic field generally parallel to the axis of the aperture confined substantially within the aperture of the solenoid, and means for varying the compression of the magnetic field.

The high field superconductive solenoid could consist of a superconducting material, alloy or compound in the form of wire, coil or ribbon. Such a solenoid includes a plurality of closely wound coils having free or unjoined ends. A coating of non-superconducting, electrically conducting material is provided on the coils prior to winding into the solenoid to delay flux leakage from the magnetic field compressed within the solenoid aperture. Such a solenoid can also have its ends joined or shorted by connecting these ends together. A coating of non-superconducting, electrically conducting or electrically insulating material is provided on the coils prior to winding into the solenoid for the same purposes.

A second superconducting solenoid with a non-superconducting coating, a superconducting rod, or a superconducting tube of uniform or non-uniform diameter is maintained below its critical temperature and inserted in the aperture of the first solenoid of non-uniform or uniform diameter to vary the compression of the magnetic field. The employment of the coated solenoid produces a slow decay of the superconducting current with a time constant of approximately $L/R_{coil}$ where L is the total inductance of the coil and $R_{coil}$ is its resistance at superconducting temperatures arising from the resistance of the non-superconducting coating on the coil windings. This decay time can be made long by using a large number of windings and employing a coating of low resistivity on the windings. The increase in the coil windings increases the inductance, L, of the coil and the coating of low resistivity decreases the non-superconducting resistance $R_{coil}$ of the coil. Since the magnetic flux can escape or decay only with a decay time of approximately $L/R$, it reduces greatly the problem of flux jumping which has been previously observed in devices which do not employ a high field superconducting solenoid.

The solenoid can be formed from windings of any high field superconducting material which can be fabricated into ribbon, coil or wire. The non-superconducting coating on the solenoid windings can be electrically conductive if the winding ends are unjoined or either electrically conducting or insulating if the winding ends are joined. For example, suitable electrically conductive coatings can be formed from copper or silver while suitable insulating coatings include ceramic materials and rubber.

Figure 3:
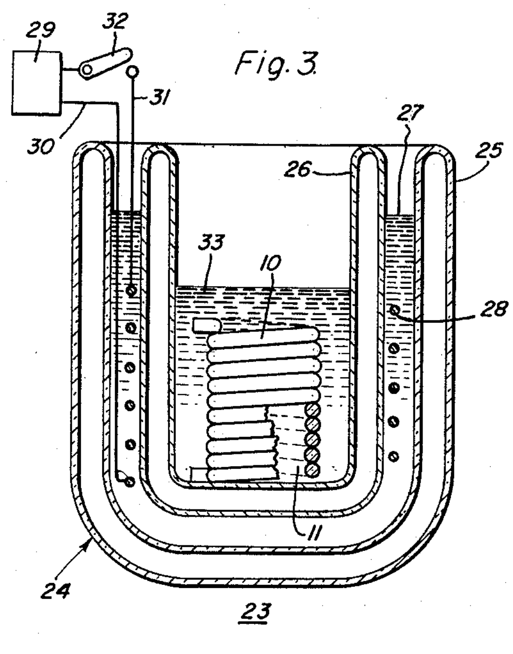
FIGURE 3 is a sectional view of apparatus for providing a magnetic field within the aperture of the solenoid shown in FIGURE 1.

In FIGURE 3, apparatus is shown generally at 23 for producing a magnetic field within aperture 11 of solenoid 10 shown in FIGURE 1 which comprises an insulated container 24 having an outer insulated vessel 25 and an inner insulated vessel 26 separated by liquid nitrogen 27. For example, solenoid 10 is positioned within inner insulated vessel 26 and on the bottom thereof. A solenoid 28, which is positioned in liquid nitrogen 27, surrounds the exterior wall of solenoid 10 and is connected to a power source 29 by means of leads 30 and 31.

A switch 32 is provided in lead 31 between solenoid 28 and power source 29 to energize and de-energize solenoid 28 to provide a magnetic field generally parallel to the axis of aperture 11 or at a slight angle thereto and within solenoid 10 and aperture 11. Liquid helium 33 is poured into vessel 26 to immerse solenoid 10 to cool the solenoid below its critical temperature $T_c$. If desired, solenoid 28 can be made of a superconductive material and positioned directly in liquid helium 33 to surround solenoid 10.

In the operation of the apparatus shown in FIGURE 3, superconductive solenoid 10 having an aperture 11 therethrough is positioned within inner insulated vessel 26 of insulated container 24. Solenoid 28 is positioned in liquid nitrogen 27 in vessel 25 to surround solenoid 10. Switch 32 is closed to energize solenoid 28 to produce a magnetic field generally parallel to the axis of aperture 11 and within both solenoid 10 and its aperture 11. Liquid helium 33 is poured into vessel 26 to contact solenoid 10 to cool the solenoid from above to below its critical temperature $T_c$.

As solenoid 10 is cooled below its critical temperature, the solenoid becomes superconducting. When solenoid 10 has become completely superconductive, the magnetic field which is parallel to the axis of the aperture is confined substantially therein. Switch 32 is then opened to de-energize solenoid 28 whereupon the applied magnetic field is terminated. The confined magnetic field within aperture 11 is enhanced in magnitude and remains therein.

Figure 4:
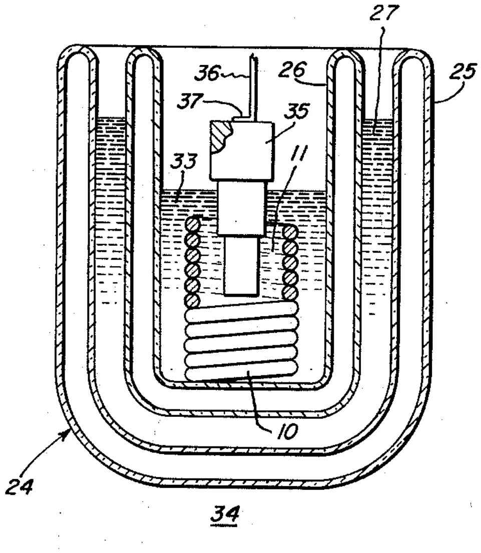
FIGURE 4 is a sectional view of a high field superconductive device embodying my invention.

In FIGURE 4, a high field superconductive device 34 is shown which comprises an insulated container 24 having an outer insulated vessel 25 and an inner insulated vessel 26 separated by liquid nitrogen 27. For example, a high field superconductive solenoid 10 having a uniform diameter aperture 11 therethrough of the type shown in FIGURE 1 of the drawing is positioned within inner insulated vessel 25 and on the bottom thereof. This solenoid has a magnetic field confined within its aperture 11 and generally parallel to the axis of the aperture. Such a magnetic field is created in the apparatus shown in FIGURE 3. Liquid helium 33 surrounds the exterior wall of solenoid 10 to maintain the temperature of the solenoid below its critical temperature.

A high field superconductive member 35 in the form of a non-uniform diameter, stepped rod is maintained below its critical temperature. Member 35 which has a diameter less than the diameter of aperture 11 in solenoid 10 is inserted into aperture 11 by means of rod 36 and bracket 37 attached to rod 36. Such insertion can be manual or automatic. When member 35 is inserted into aperture 11, the confined magnetic field is compressed within aperture 11 to increase the magnitude of the field strength between rod 35 and the interior wall of solenoid 10 thereby producing a compressed field, $H_{com}$. Since both rod 35 and the solenoid are superconducting, they act to exclude the magnetic flux therefrom. Member 35 varies the compression and thus the magnitude of the confined magnetic field by the different diameters of its stepped construction. The highest compression results at the point where the largest diameter step of member 35 is positioned within aperture 11. When member 35 is positioned completely within aperture 11, three compression magnetic field strengths of different magnitude exist. The member can be provided with a larger or smaller number of steps.

Figure 5:
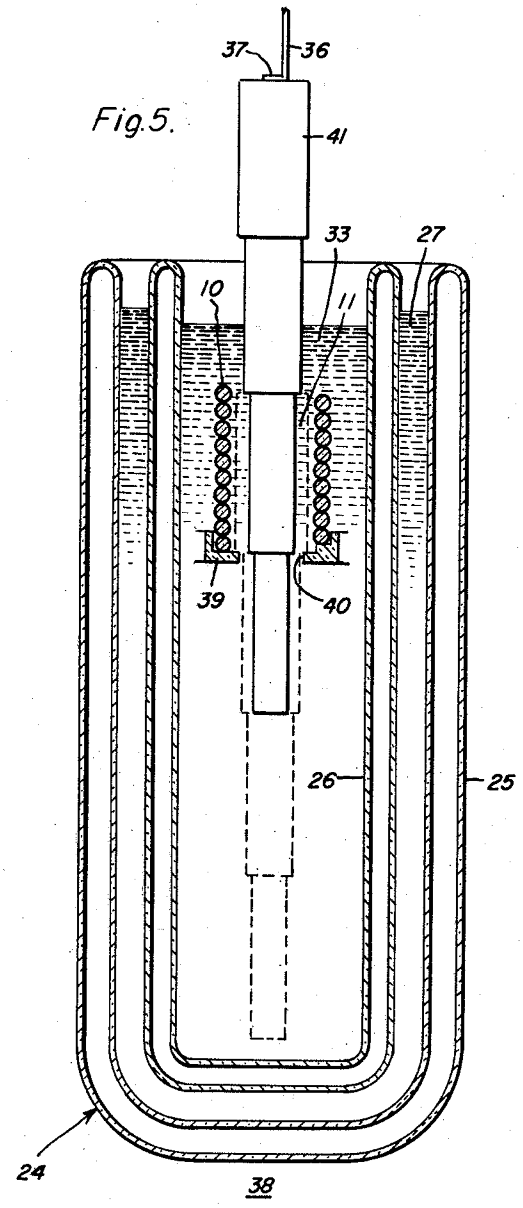
FIGURE 5 is a sectional view of a modified high field superconductive device.

In FIGURE 5, a high field superconductive device 38 is shown which comprises an insulated container 24 having an outer insulated vessel 25 and an inner insulated vessel 26 separated by liquid nitrogen 27. For example, a high field superconductive solenoid 10 of the type shown in FIGURE 1 having a uniform diameter aperture 11 therethrough is positioned on a support member 39 within inner insulated vessel 26. An aperture 40 is disposed centrally in member 39 and is in axial alignment with aperture 11 of solenoid 10. A magnetic field is confined within aperture 11 of solenoid 10 by means of the apparatus shown in FIGURE 3 of the drawing. Liquid helium 33 surrounds the exterior wall of solenoid 10 to maintain the temperature of the solenoid below its critical temperature.

A non-uniform diameter, stepped high field superconductive member 41, which is maintained below its critical temperature, is shown partially positioned within aperture 11 of solenoid 10 to vary the compression of the magnetic field in aperture 11. Each step of member 41 is approximately the same length as the length of aperture 11. While four such steps are shown as comprising member 41, a larger or smaller number of steps can be employed in such a member. Member 41 has a rod 36 and bracket 37 for inserting member 41 into aperture 11.

When member 41 is inserted into aperture 11 of solenoid 10, the confined magnetic field in aperture 11 is compressed between each stepped portion of member 41 and the wall of aperture 11. Since both the member and the aperture wall are superconducting, the magnetic flux is excluded by both into the space therebetween. The highest compression of the confined magnetic field is obtained when the largest diameter step of member 41 is within aperture 11. In addition to varying the compression of the magnetic field by the insertion of a single step of member 41 in aperture 11, it is also possible to insert a portion of two adjacent steps to provide two compressed magnetic field strengths of different magnitude within the same aperture.

Figure 6:
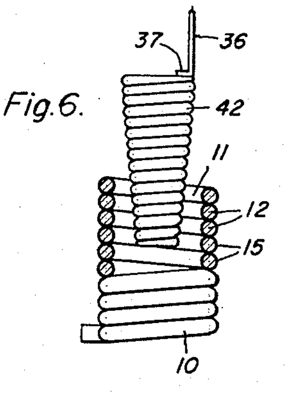
FIGURE 6 is a sectional view of a portion of a further modified high field superconductive device.
Figure 7:
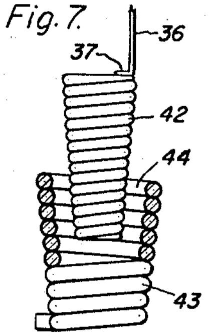
FIGURE 7 is a sectional view of a portion of a further modified high field superconductive device.
Figure 8:
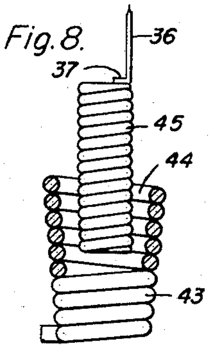
FIGURE 8 is a sectional view of a further modified high field superconductive device.

FIGURES 6, 7 and 8 show further modified high field superconductive devices including a superconductive solenoid and means for varying the compression of the magnetic field. For simplicity, the insulating container 24 and liquid helium 33 have been omitted from each of these figures.

FIGURE 6 discloses a high field superconductive solenoid 10 having a uniform aperture 11 therethrough. A non-uniform diameter, stepped high field superconductive member 42 in the form of a second solenoid with a coating of a non-superconducting material thereon is positioned within aperture 11 of solenoid 10 to vary the compression of the confined magnetic field therein. A rod 36 with bracket 37 provide means for inserting and withdrawing solenoid 42.

FIGURE 7 shows a non-uniform diameter high field superconductive solenoid 43 with a coating of a non-superconducting material thereon and having a non-uniform diameter, aperture 44 therethrough. A non-uniform diameter, high field superconductive solenoid 42 having a rod 36 attached thereto by means of bracket 37 is shown positioned within superconductive solenoid 43 to vary the compression of the magnetic field confined within aperture 44.

FIGURE 8 discloses a non-uniform diameter high field superconductive solenoid 43 with a non-uniform diameter aperture 44 therethrough. A uniform diameter, high field superconductive solenoid 45 with a rod 36 attached thereto by means of bracket 37 is positioned within aperture 44 of solenoid 43. Solenoid 45 has a coating of a non-superconducting material thereon. When solenoid 45 is inserted into aperture 44, the compression of the confined magnetic field within the aperture is varied.

In each of the above figures, the space between the inserted superconductive member and the aperture wall provides a region in which material can be placed before or after the magnetic field has been compressed to subject the material to this field. If it is desired, the material, for example, in the form of a body or gaseous plasma can be surrounded by a thermally insulated container within the compressed field so that the material can be subjected to a temperature different from the temperature of the superconductive body and controlled by external means.

While other modifications of this invention and variations thereof which may be employed within the scope of the invention have not been described, the invention is intended to include such that may be embraced within the following claims.

What I claim as new and desire to secure by Letters Patent of the United States is:

1. A high field superconductive device comprising a high field superconductive solenoid having an aperture therethrough, a coating of non-superconducting material on said solenoid, means to produce a magnetic field generally parallel to the axis of the aperture substantially within the aperture of said solenoid, means to maintain the temperature of said solenoid below its critical temperature and means for compressing variably said magnetic field.

2. A high field superconductive device comprising an insulated container, a high field superconductive solenoid positioned in said container, a coating of non-superconducting material on said solenoid, said solenoid having an aperture therethrough, means to produce a magnetic field generally parallel to the axis of the aperture substantially within the aperture of said solenoid, a coolant within said container contacting the exterior wall of said solenoid to maintain the temperature of said solenoid below its critical temperature, and means for compressing variably said magnetic field.

3. A high field superconductive device comprising a high field superconductive solenoid having a uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a non-uniform diameter, high field super-conductive member maintained at a temperature below its critical temperature, said member adapted to be inserted into the aperture of said solenoid compressing variably said magnetic field.

4. A high field superconductive device comprising a high field superconductive solenoid having a non-uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a uniform diameter, high field superconductive member maintained at a temperature below its critical temperature, said member adapted to be inserted into the aperture of said solenoid for compressing variably said magnetic field.

5. A high field superconductive device comprising a high field superconductive solenoid having a non-uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a non-uniform diameter, high field superconductive member maintained at a temperature below its critical temperature, said member adapted to be inserted into said aperture for compressing variably said magnetic field.

6. A high field superconductive device comprising a high field superconductive solenoid having a uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a stepped, high field superconductive member of the same length as said solenoid maintained at a temperature below its critical temperature, said member adapted to be inserted into said aperture for compressing variably said magnetic field.

7. A high field superconductive device comprising a high field superconductive solenoid having a uniform diameter aperture therethrough, a coating of non-superconductive material on said solenoid, means to produce a magnetic field generally parallel to the axis of said aperture substantially within the aperture of said solenoid, means to maintain the temperature of said solenoid below its critical temperature, and a stepped, high field superconductive body maintained at a temperature below its critical temperature, each step of said member of the same length as said solenoid, said member adapted to be inserted into said aperture for compressing variably said magnetic field.

8. A high field superconductive device comprising a high field superconductive solenoid having a uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a second high field superconductive solenoid maintained at a temperature below its critical temperature, a coating of non-superconducting material on said second solenoid, said second solenoid adapted to be inserted into said aperture for compressing variably said magnetic field.

9. A high field superconductive device comprising a high field superconductive solenoid having a uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a second non-uniform diameter, high field superconductive solenoid maintained at a temperature below its critical temperature, a coating of non-superconducting material on said second solenoid, said second solenoid adapted to be inserted into the aperture of said first solenoid for compressing variably said magnetic field.

10. A high field superconductive device comprising a high field superconductive solenoid having a non-uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a second uniform diameter, high field superconductive solenoid maintained at a temperature below its critical temperature, a coating of non-superconducting material on said second solenoid, said second solenoid adapted to be inserted into the aperture of said first solenoid for compressing variably said magnetic field.

11. A high field superconductive device comprising a high field superconductive solenoid having a non-uniform diameter aperture therethrough, a coating of non-superconducting material on said solenoid, means to produce a magnetic field generally parallel to the axis of said aperture substantially within the aperture of said solenoid, means to maintain the temperature of said solenoid below its critical temperature, and a second non-uniform diameter, high field superconductive solenoid maintained at a temperature below its critical temperature, a coating of non-superconducting material on said second solenoid, said second solenoid adapted to be inserted into said aperture for compressing variably said magnetic field.

References Cited by the Examiner

UNITED STATES PATENTS

| | | | |
|---|---|---|---|
| 2,916,615 | 12/59 | Lundburg | 340—173.1 |
| 2,936,435 | 5/62 | Buck | 340—173.1 |
| 2,946,030 | 7/60 | Slade | 336—155 |
| 3,109,963 | 11/63 | Geballe | 317—158 |

OTHER REFERENCES

Tanenbaum, M.: "Superconductors," New York, N.Y., Interscience Publishers, Feb. 18, 1962, (pages 61–68).

E. JAMES SAX, *Primary Examiner.*

JOHN F. BURNS, *Examiner.*